Feb. 12, 1952          J. E. CONDON          2,585,742
COLLAPSIBLE TABLE MOUNTABLE ON AUTOMOBILE SEAT
Filed Sept. 23, 1950          3 Sheets-Sheet 1
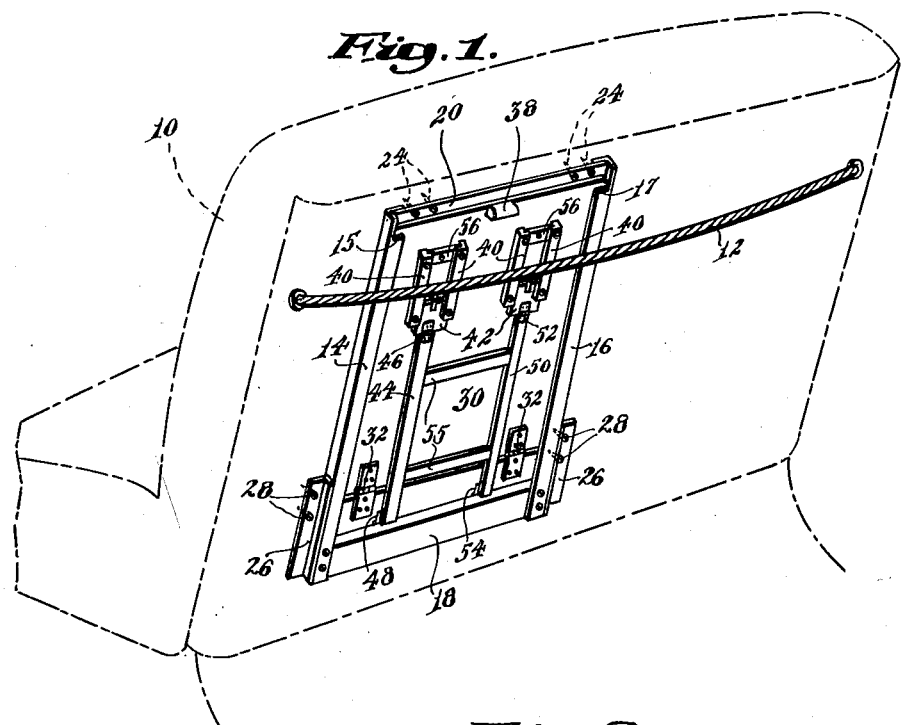
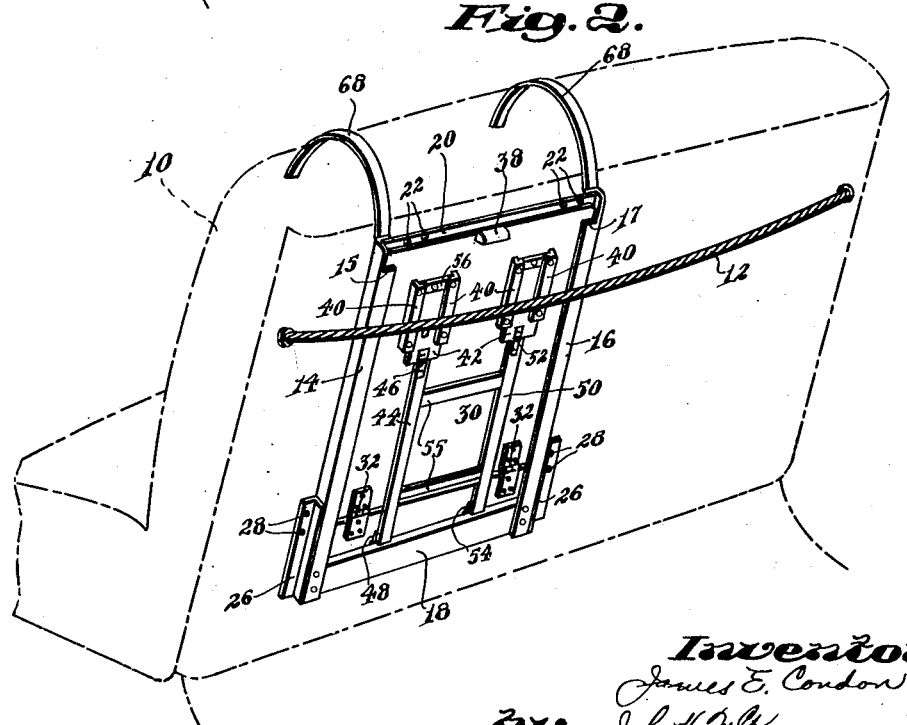
Inventor:
James E. Condon
by John H. McKenna
Attorney

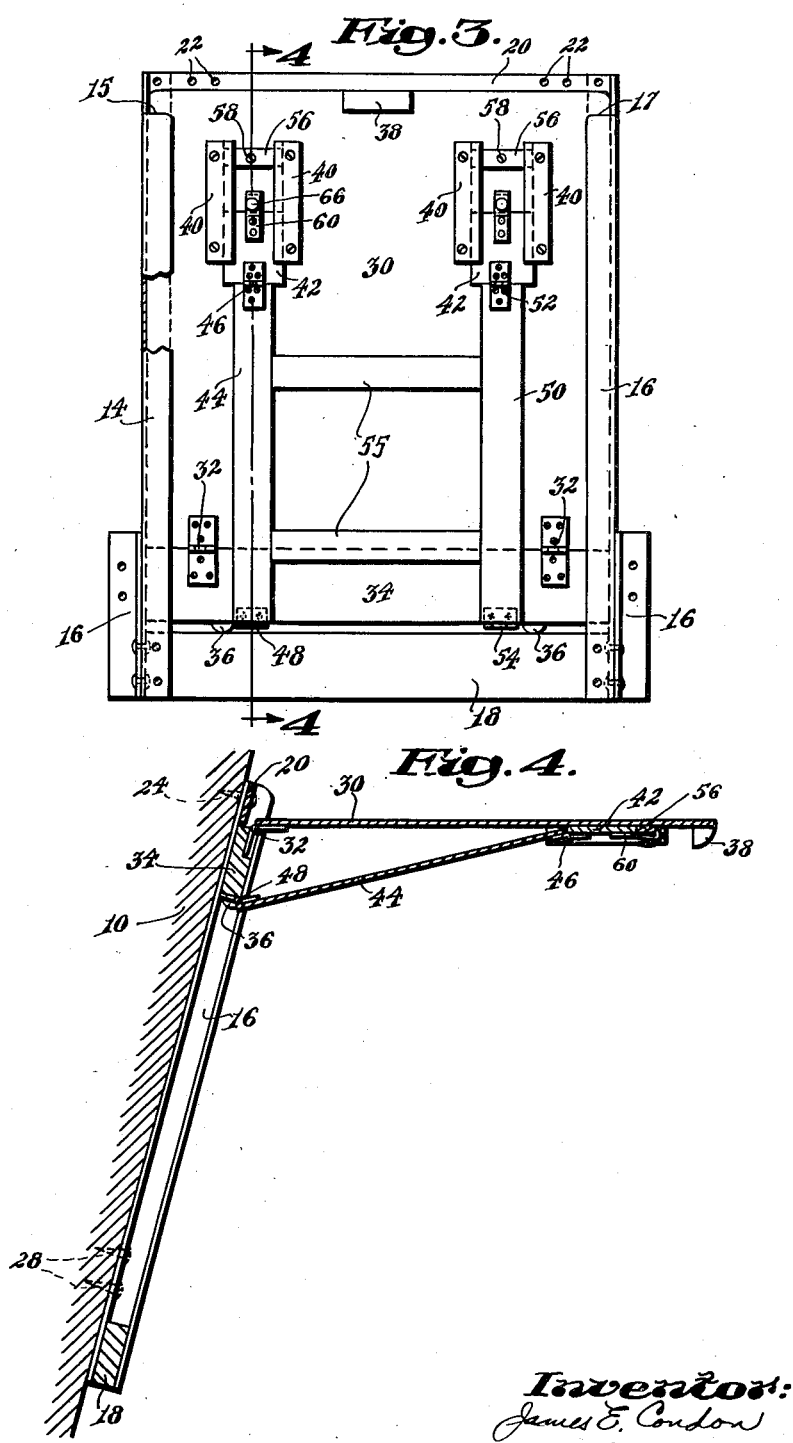

Feb. 12, 1952 J. E. CONDON 2,585,742
COLLAPSIBLE TABLE MOUNTABLE ON AUTOMOBILE SEAT
Filed Sept. 23, 1950 3 Sheets-Sheet 3
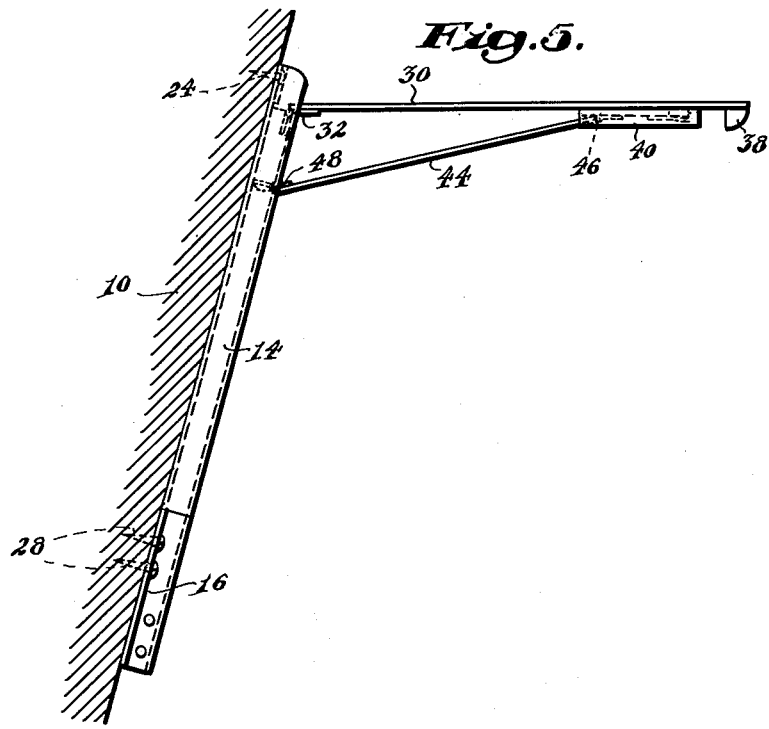
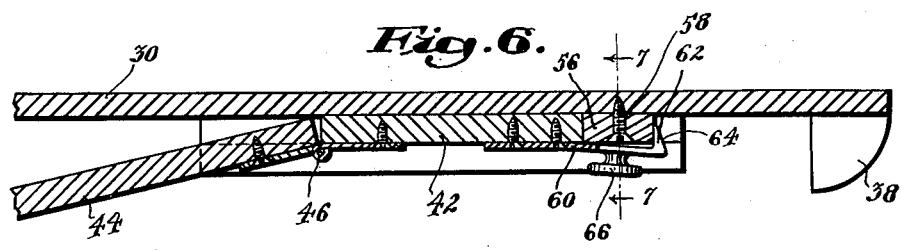
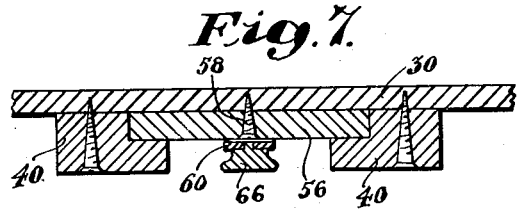

Patented Feb. 12, 1952

2,585,742

UNITED STATES PATENT OFFICE 2,585,742

COLLAPSIBLE TABLE MOUNTABLE ON AUTOMOBILE SEAT

James E. Condon, Roxbury, Mass.

Application September 23, 1950, Serial No. 186,403

4 Claims. (Cl. 311—21)

This invention relates to improvements in collapsible tables and more particularly to tables which are adapted to be mounted on the back of the front seat of a vehicle and which may be quickly moved between an operative position forward of the rear seat of the vehicle and an out-of-the-way position in which it becomes compactly collapsed in a retaining frame at the back of the front seat.

Tables of the general type to which the invention relates have been proposed heretofore for the convenience of passengers on the rear seats of automobiles. However, so far as I am aware, the prior tables proposed for this purpose have been designed for mounting on vehicle seats whose backs have had a particular inclination from verticality. If a seat varied from that particular inclination, the table, in set-up condition, could not be in a horizontal plane unless some filler means were inserted between the seat and table frame to make the frame have the said particular inclination. Also, the prior comparable tables have required substantial forwardly projecting supporting parts in positions to inconvenience passengers when the tables have been in use.

It is among the objects of my present invention to provide a vehicle table having provision for ensuring horizontality of the table in its set-up position regardless of what the inclination of the back of any particular supporting front seat may be. According to the invention, the table and hinged supporting struts are withdrawable from a retaining frame which may be fixed on the back of the front seat of a vehicle, and the hinged struts slide relative to the table during movement of the table to operative position, with adjustable stop means on the table for stopping the relative movement of the struts when the table reaches a generally horizontal plane.

Another object of the invention is to provide a collapsible vehicle table wherein a table and hinged supporting struts therefore are withdrawable from a retaining frame which may be fixed on the back of the front seat of a vehicle, the supporting struts being slidably hinged to the table and hinged to slide elements in the frame, the latter said hinges providing for forward and downward swinging movements of the table and struts when the table and struts are clear of the frame, there being adjustable stop means for stopping the forward and downward movement of the table when it is in a generally horizontal plane.

It is, moreover, my purpose and object generally to improve the structure, serviceability and efficiency of collapsible tables, and especially such tables designed for use in automobiles and comparable vehicles.

In the accompanying drawings:

Fig. 1 is a perspective view of a collapsed vehicle table embodying features of my invention shown mounted on the back of the front seat of an automobile;

Fig. 2 is a similar view showing a modified form of securing means for the upper portion of the table frame;

Fig. 3 is a plan view of the collapsed table and its retaining frame, looking at the under side of the table;

Fig. 4 is a cross-sectional view on line 4—4 of Fig. 3 but showing the table in its operative position;

Fig. 5 is a side elevation of the table and frame, with the table in operative position, the seat support for the frame being in section;

Fig. 6 is a fragmentary view on line 4—4 showing, on a larger scale, the forward portion of the table and one of the sliding hinged struts latched against one of the adjustable stops; and Fig. 7 is a cross-sectional view on line 7—7 of Fig. 6.

Referring to the drawings, the front seat of an automobile is represented by broken lines at 10 in Figs. 1 and 2, and a conventional lap-robe rope is indicated at 12 secured to the back of seat 10. The collapsible table of the invention is mounted on the back of seat 10 between the seat and the rope 12, so that the table, in its collapsed condition of Figs. 1 and 2, will not interfere with normal uses of the rope.

The table comprises a rectangular frame having the oppositely disposed side channel elements 14, 16, secured together at their lower ends by the bar 18, which conveniently may be of wood, and secured together at their upper ends by the rigid metal strip element 20 which may have the holes 22 therein for reception of screws 24 by which the upper end of the frame may be secured to the back of seat 10, as in Figs. 1, 4 and 5. The lower end portion of the frame may be secured to the seat in any of various ways. As shown, each side channel element has an angle-iron bracket 26 secured thereto by which the frame may be secured, at each side, by screws 28 extending through a flange of each bracket 26 and into a solid part of seat 10.

A rigid, relatively thin sheet member 30 provides the plane work surface of the table in its set-up condition of Figs. 4-6. Sheet member 30 is illustrated in Figs. 1-3 lowered into the retaining side channel elements 14, 16 of the frame, with its opposite side margins slidably engaged within the channels, and with its lower edge hinged at 32, 32 to a transverse slide bar 34 whose opposite ends are slidably engaged in the side channel elements 14, 16 of the frame. The hinged connections at 32, 32 preferably are set into the slide bar 34, as shown in Fig. 4, so that the adjacent end of sheet member 30 extends beyond and rests upon the channel shoulders at 15, 17 when the sheet member 30 is in horizontal operative position. The lower edge of slide bar 34 preferably is equipped with the shock-absorbing elements 36 which engage the upper edge of fixed frame bar 18 for cushioning the shock if and when the sheet member 30 is dropped into the frame, the frame bar 18 constituting a stop which limits the downward travel of the sheet member 30 and slide bar 34 in the frame.

The upper edge portion of sheet member 30 (Figs. 1–3) has a grip piece 38 thereon to facilitate lifting of member 30 along the side channels in the process of setting up the table for use. The member 30 may be lifted along the channels until the slide bar 34 is stopped against the top frame strip 20, as best seen in Fig. 4. When bar 34 stops against strip 20, the sheet member 30 may be swung forwardly and downwardly on the hinges 32, an upper end portion of the forward wall of each channel element 14, 16 being broken away at 15, 17, respectively, to permit the said forwardly and downwardly movement of sheet member 30.

Sheet member 30 has secured thereon the two pairs of relatively short and parallel guide strips 40 within each pair of which a rectangular member 42 is slidable. A strut element 44 has one end hinged at 46 to one of the slidable members 42 and has its other end hinged at 48 to the lower edge of slide bar 34. A similar strut element 50 has one end hinged at 52 to the other slidable member 42 and has its other end hinged at 54 to the lower edge of slide bar 34. Preferably, the two strut elements 44, 50 are rigidly connected together by one or more brace bars 55.

When the sheet member 30 is lifted along the frame channels 14, 16 from its Fig. 1 position and then is swung forwardly and downwardly on hinges 32 toward its horizontal operative position of Figs. 4 and 5, the rectangular members 42 slide along the guide strips 40 until they are stopped against the abutments 56, one of which is adjustably fixed in each pair of guide strips 40.

Inasmuch as the inclination of the back of seat 10 may vary in different vehicles, the downwardly swinging movement of sheet member 30 must be stopped when it is in a proper angular relation to the plane of the channel elements 14, 16 if it is to rest in a horizontal plane, assuming the floor of the vehicle to be in a horizontal plane.

According to the invention, the abutments 56 may be selectively set along the guide strips 40 to stop the sheet member 30 in a horizontal plane when the retaining frame is mounted on a seat having any particular inclination. Before fixing the abutments 56 in place, they may be slid along the guide strips to any selected proper position, after which each may be securely fixed in its selected position by a single screw 58 or other conventional securing means. Hence, when a table is being installed in any particular vehicle, it quickly can be adapted to the seat inclination of that vehicle.

It is a feature of importance, that sheet member 30, when in its operative position of Figs. 4 and 5, is rigidly and strongly supported by means which is high up under the table well out of the way of a person using the table. The hinged edge of sheet 30 becomes effectively supported on the shoulders of the forward flanges of the channel elements at 15, 17, while the struts 44, 50 effectively coact with the abutments 56 to support the forward portion of sheet 30.

While it is not necessary that the sheet member 30 be secured in its operative position, it may be desirable in some cases to releasably lock or latch it in its operative horizontal plane. Conveniently, a simple spring latch 60 may be secured on one or both of the rectangular members 42, with a hook 62 for engaging back of one or both abutments 56 when the members 42 stop against the abutments. The hook 62 may have a cam surface 64 thereon for riding over the abutment as a member 42 approaches the abutment, and the latch may have a knob 66 thereon to facilitate manual release of the latch, as best seen in Fig. 6.

If desired, the retaining frame may have resilient hook elements 68 (Fig. 2) at its upper edge, for engaging over the upholstered top portion of seat 10, instead of or in addition to the securing screws 24.

It is intended that the patent shall cover, by suitable expression in the appended claims, whatever features of patentable novelty exist in the invention disclosed.

I claim as my invention:

1. A collapsible table comprising a generally rectangular frame having oppositely disposed channel elements extending in parallelism along opposite sides of the frame and having abutment means at the upper and at the lower end portions of said channel elements, a rigid transverse member extending between said channel elements with its opposite ends slidably engaged in said channels, whereby said rigid member is movable along the channels between said upper and lower abutment means, a rigid sheet member hingedly connected to the upper edge of said rigid transverse member, said sheet member, when in the general plane of said channels being movable into said channels with movement of said rigid transverse member toward the said lower abutment means, and being swingable about said hinged connection when said rigid transverse member is stopped against said upper abutment means, guide means on said sheet member, a sliding member movable along said guide means, a strut element having one edge hingedly connected to said sliding member and its other end hingedly connected to the lower edge of said rigid transverse member, whereby the sliding member moves in one direction along said guide means when said sheet member is swung from its position in the general plane of said channels toward a predetermined angularly related plane, and an adjustable stop for stopping said movement of the sliding member when said sheet element is in said predetermined angularly related plane.

2. A collapsible vehicle table comprising two rigid channel elements, means for mounting said elements in opposed spaced parallelism on the back of a seat in a vehicle, upper and lower abutment means at the opposite end portions of the channel elements, a cross-bar having its opposite ends slidably engaged in said channel elements and movable therealong between said upper and lower abutment means, a rigid sheet member having one edge hingedly connected to the upper edge of said cross-bar, guide means on said sheet element, a sliding member movable along said guide means, a strut element hinged at one end to said sliding member and hinged at its other end to the lower edge of said cross-bar, said rigid sheet member being swingable about its said hinged connection to the cross-bar when the latter is at the upper limit of its travel thereby to move the sheet element between a position in the general plane of said channel elements wherein it may be lowered into and withdrawn from the channel elements and an operative position wherein it extends in a predetermined plane angularly related to the plane of said channel elements, with said sliding member moving along said guide means, and an adjustable stop for limiting the movement of the sliding member in one direction thereby to stop a swinging movement of the rigid sheet member when it reaches its said operative position in a predetermined plane angularly related to the plane of said channel elements.

3. A collapsible vehicle table comprising two rigid channel elements, means for mounting said elements in opposed spaced parallelism on the back of a seat in a vehicle, upper and lower abutment means at the opposite end portions of the channel elements, a cross-bar having its opposite ends slidably engaged in said channel elements and movable therealong between said upper and lower abutment means, a rigid sheet member having one edge hingedly connected to the upper edge of said cross-bar, and having width for slidably engaging in said channel elements, upper wall portions of the channel elements being removed to provide supporting shoulders for said sheet element when the latter is in an operative position, guide means on said sheet element, a sliding member movable along said guide means, a strut element hinged at one end to said sliding member and hinged at its other end to the lower edge of said cross-bar, said rigid sheet member being swingable about its said hinged connection to the cross-bar when the latter is at the upper limit of its travel thereby to move the sheet element between a position in the general plane of said channel elements wherein it may be lowered into and withdrawn from the channel elements and an operative position wherein it extends in a predetermined plane angularly related to the plane of said channel elements, with said sliding member moving along said guide means, and an adjustable stop for limiting the movement of the sliding member in one direction thereby to stop a swinging movement of the rigid sheet member when it reaches its said operative position in a predetermined plane angularly related to the plane of said channel elements.

4. A collapsible vehicle table comprising two rigid channel elements, means for mounting said elements in opposed spaced parallelism on the back of a seat in a vehicle, upper and lower abutment means at the opposite end portions of the channel elements, a cross-bar having its opposite ends slidably engaged in said channel elements and movable therealong between said upper and lower abutment means, a rigid sheet member having one edge hingedly connected to the upper edge of said cross-bar, guide means on said sheet element, a sliding member movable along said guide means, a strut element hinged at one end to said sliding member and hinged at its other end to the lower edge of said cross-bar, said rigid sheet member being swingable about its said hinged connection to the cross-bar when the latter is at the upper limit of its travel thereby to move the sheet element between a position in the general plane of said channel elements wherein it may be lowered into and withdrawn from the channel elements and an operative position wherein it extends in a predetermined plane angularly related to the plane of said channel elements, with said sliding member moving along said guide means, and an adjustable stop for limiting the movement of the sliding member in one direction thereby to stop a swinging movement of the rigid sheet member when it reaches its said operative position in a predetermined plane angularly related to the plane of said channel elements, and means for releasably retaining the rigid sheet member against accidental displacement out of said predetermined plane.

JAMES E. CONDON.

REFERENCES CITED

The following references are of record in the file of this patent:

UNITED STATES PATENTS

| Number | Name | Date |
| --- | --- | --- |
| 286,891 | Abbot | Oct. 16, 1883 |
| 1,780,706 | Goldbecher | Nov. 4, 1930 |
| 1,790,468 | Frank et al. | Jan. 27, 1931 |
| 1,809,866 | Riesche | June 16, 1931 |
| 2,184,047 | King | Dec. 19, 1939 |